March 15, 1955 — T. P. SHEEHAN — 2,704,349
ELECTRICAL INSTRUMENT
Filed March 28, 1951 — 3 Sheets-Sheet 1
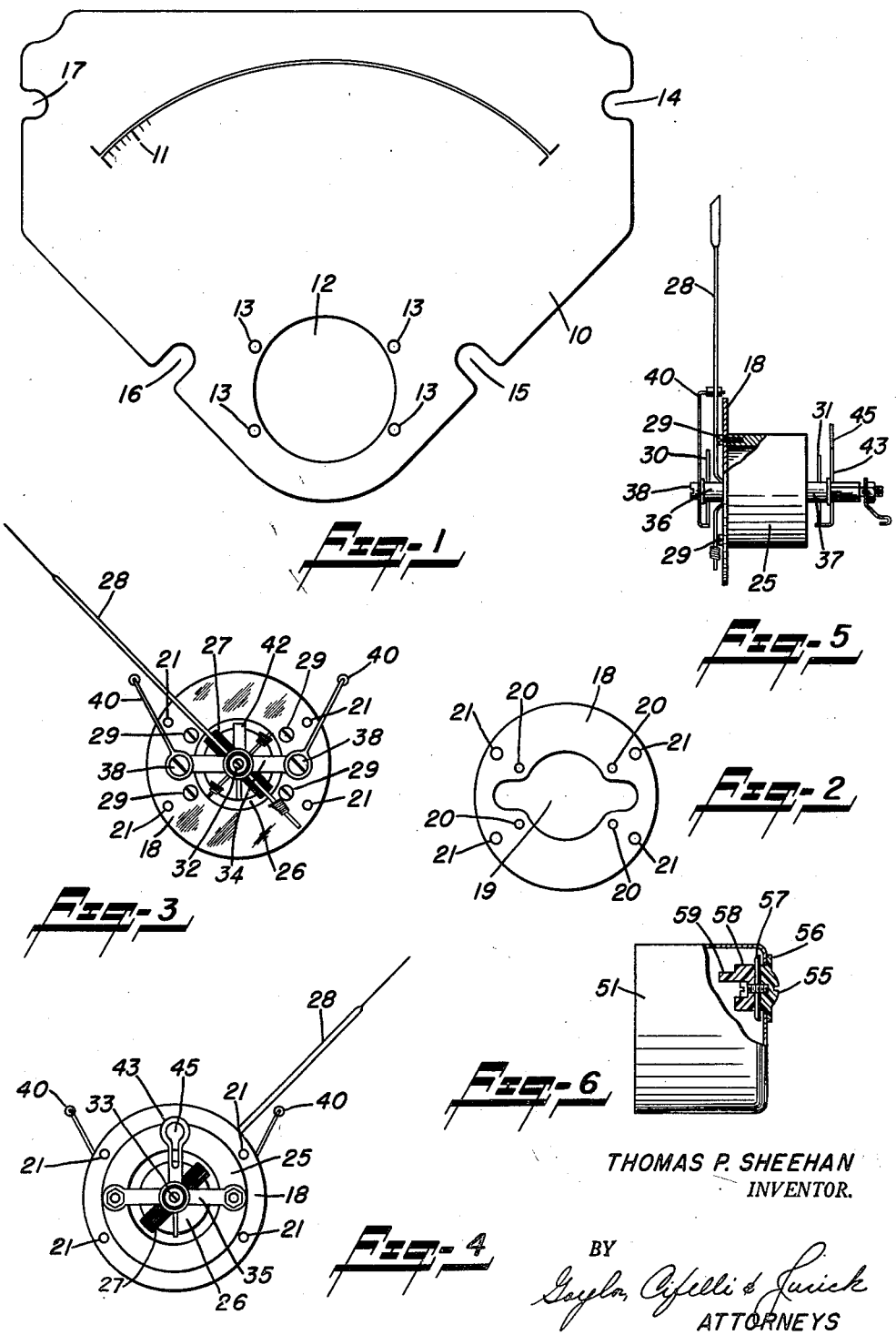
THOMAS P. SHEEHAN
INVENTOR.
BY
ATTORNEYS

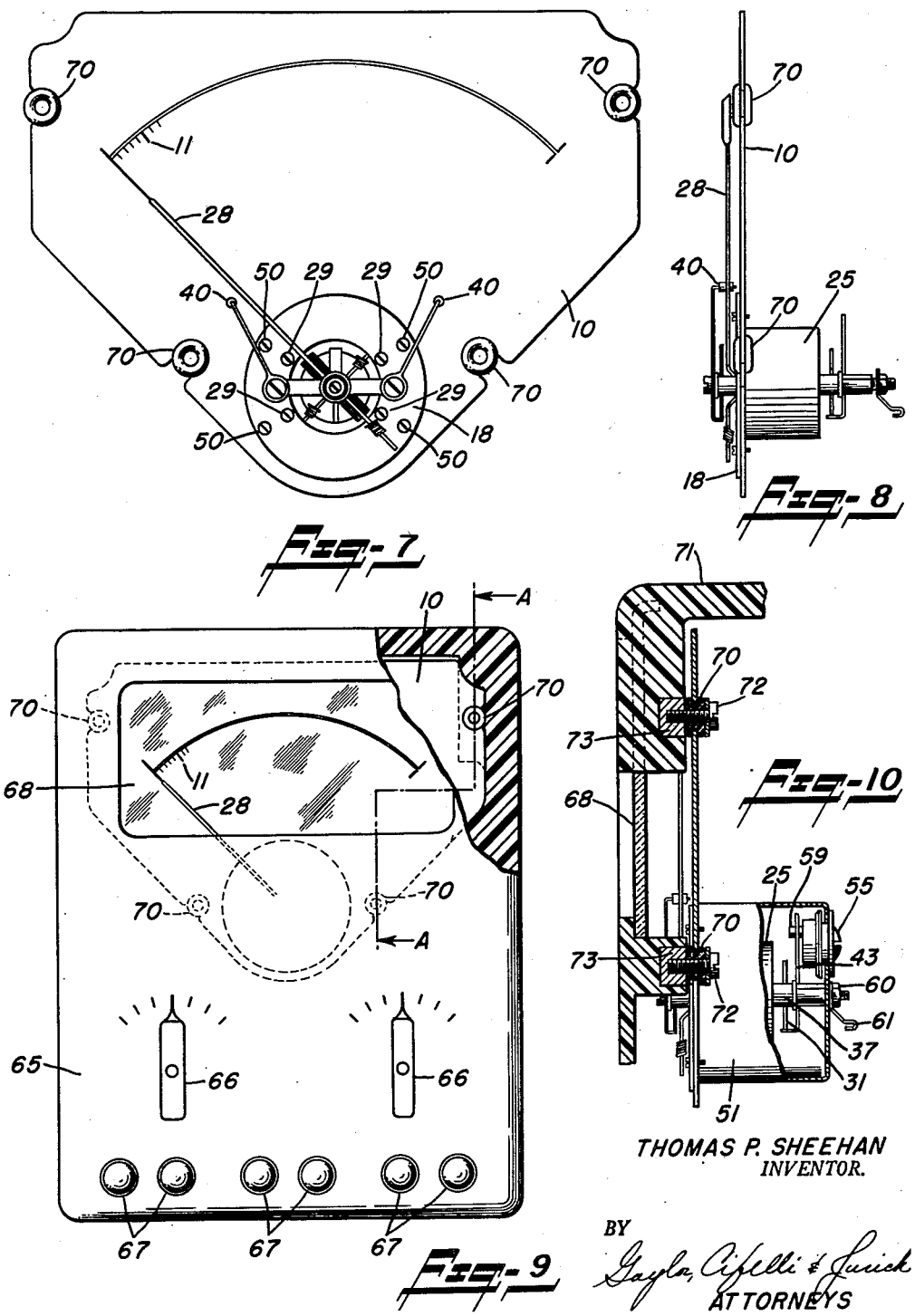

March 15, 1955  T. P. SHEEHAN  2,704,349
ELECTRICAL INSTRUMENT
Filed March 28, 1951  3 Sheets-Sheet 3
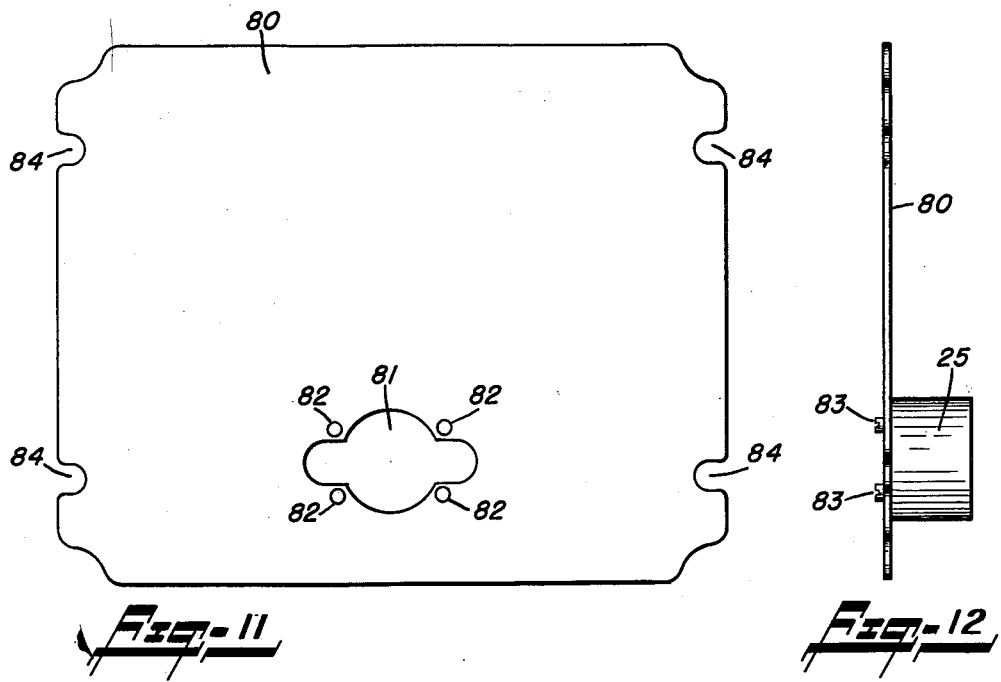
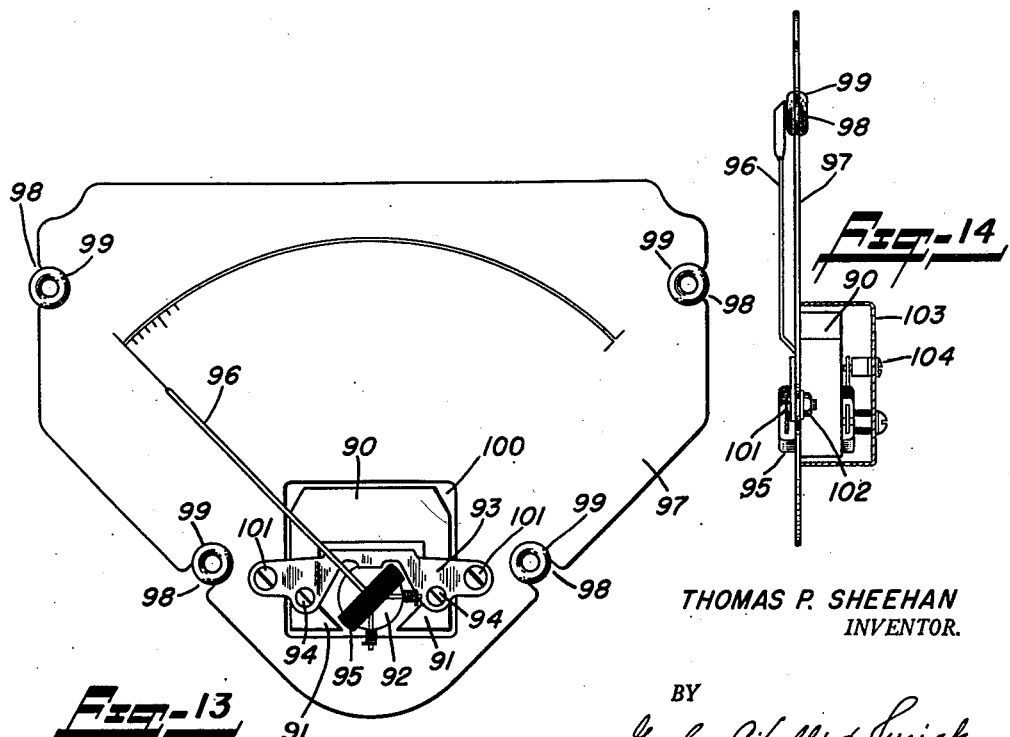
THOMAS P. SHEEHAN
INVENTOR.
BY
Gaylor, Cifelli & Jurick
ATTORNEYS

United States Patent Office 2,704,349
Patented Mar. 15, 1955

2,704,349

ELECTRICAL INSTRUMENT

Thomas P. Sheehan, Union, N. J., assignor to Weston Electrical Instrument Corporation, Newark, N. J., a corporation of New Jersey Application March 28, 1951, Serial No. 217,995

1 Claim. (Cl. 324—156)

This invention relates to electrical test sets and more particularly to the novel construction of the electrical indicating instrument adapted for use in a test set and a novel mounting arrangement of such instrument within the test set housing.

In multi-purpose test sets, analysers and the like, a single electrical indicating instrument is employed, generally, to provide a quantitative indication of such factors as volts, amperes, ohms, etc. The electrical instrument and numerous other components are disposed within a suitable housing that carries selector switches to condition the electrical circuit for specific measurements. The number of such components required for an all-purpose test is such that space is an important factor if the housing is to be kept reasonably small. Additionally, it is becoming of increasing importance to construct such tests so that they will withstand rough usage and rather severe mechanical shocks. This latter requirement places additional burdens upon the designer as conventional means for shock-mounting the components, particularly the sensitive indicating instrument, occupy additional space within the housing.

An object of this invention is the provision of an electrical instrument of novel construction, whereby the instrument may be provided with a large scale plate while, at the same time, the instrument mechanism occupies a minimum space within the housing of a test set.

An object of this invention is the provision of an electrical instrument wherein the instrument mechanism and the scale plate are assembled as an integral unit.

An object of this invention is the provision of a test set including an electrical indicating instrument that is supported, as a unit, from the front panel of the test set housing.

An object of this invention is the provision of an electrical instrument for use in a test set, said instrument so constructed that it is secured to the front panel of the set housing by means of its own scale plate.

An object of this invention is the provision of a novel shock-protected mounting arrangement of an electrical instrument within the housing of a multi-purpose test set.

These and other objects and advantages will be apparent from the following description when taken with the accompanying drawings. The drawings are for purposes of illustration and are not to be construed as defining the scope or limits of the invention, reference being had for the latter purpose to the appended claim.

In the drawings wherein like reference characters denote like parts in the several views:

Figure 1 is a front view of the instrument scale plate;

Figure 2 is a front view of a mounting ring employed to secure the instrument mechanism and the scale plate to form an integral unit;

Figure 3 is a front view of the instrument mechanism secured to the mounting ring;

Figure 4 is a rear view of the instrument assembly shown in Figure 3;

Figure 5 is a side view of instrument assembly shown in Figure 3;

Figure 6 is an elevation view of a dust cover adapted for use with the instrument assembly and with parts broken away to show the zero adjuster arrangement whereby the instrument pointer may be set to a specific point with reference to the instrument scale plate;

Figure 7 is a front view showing the assembled instrument mechanism and scale plate;

Figure 8 is a side view of the Figure 7 assembly;

Figure 9 is a front view of a representative test set showing the instrument assembly secured to the front panel of the set housing;

Figure 10 is a sectional view taken along the line A—A of Figure 9;

Figure 11 is a front view of an instrument scale plate adapted for direct attachment to the instrument mechanism thereby eliminating the separate mounting ring;

Figure 12 is a side view showing the scale plate of Figure 11 secured to the soft-iron yoke of an instrument mechanism of the type shown in Figure 5;

Figure 13 is a front view showing another embodiment of the invention wherein the scale plate is secured to an instrument mechanism employing a conventional C-shaped permanent magnet; and Figure 14 is a side view of the Figure 13 assembly.

Referring now to Figure 1, the scale plate 10, preferably made of metal with a suitable coating thereon, carries the calibrated scales 11. The plate includes a circular opening 12, four threaded holes 13 and four slots 14–17 inclusive, the purposes of which will become apparent hereinbelow.

Figure 2 illustrates a metallic mounting ring 18 provided with an elongated opening 19, four holes 20 and four holes 21. The holes 20 are used to secure the mounting ring to the soft-iron yoke 25 of the instrument mechanism, by the means of the screws 29 as shown in Figures 3 and 5, whereas the holes 21 are used for securing the scale plate to the mounting ring, as will be described hereinbelow.

The instrument mechanism is of the core-magnet type as shown in Figures 3 to 5. It comprises a substantially cylindrical, permanent magnet 26 spaced from the soft-iron yoke 25 to provide a magnetic flux gap within which the pivotally-mounted movable coil 27 rotates. The movable coil, carrying the pointer 28, rotates through an angle which varies with the magnitude of the current flowing in the coil, the current being conducted to the coil through the spiral hair spring 30, 31, as is well known in this art. As is common practice, the movable coil is carried by axially aligned staffs, or pivots, rotatable in adjustable jewel bearings 32, 33 carried by the bridge members 34, 35 respectively. Such bridge members, disposed on opposite sides of the mechanism, are secured to, and spaced from, the yoke by the upright posts 36, 37, threadedly secured to the soft-iron yoke. The upper set of such posts 36 are provided with threaded, axial bores to receive the screws 38 by which the flexible bumpers 40, Figure 3, are retained in proper position. These bumpers protect the pointer from damage in the event the instrument coil is subjected to excessive rotary motion, that is, beyond the normal scale range. Rotatably secured to the upper bridge member 34 is an abutment 42, see Figure 3, to which one end of the upper, hair spring 30 is attached, see Figure 5. Similarly, the elongated abutment 43, Figure 4, is carried by the lower bridge member 35. This abutment includes an aperture 45 therein within which the pin of the zero adjuster operates, as will be explained in more detail with reference to Figure 10.

Figures 7 and 8 illustrate the complete assembly of the scale plate 10, mounting ring 18 and the instrument mechanism. As stated hereinabove, the mounting ring 18 is secured to the soft-iron yoke 25 by means of the four screws 29. This yoke is then inserted through the circular opening of the scale plate (opening 12, Figure 1) which opening has a diameter sufficient to clear the yoke and the other parts forming the instrument mechanism. The scale plate is now secured to the mounting ring by the screws 50 passing through the holes 21 (Figure 2) in the mounting ring and into the threaded holes 13 (Figure 1) of the scale plate. It will now be clear the entire indicating instrument is assembled as an integral unit and any electrical or mechanical adjustments of the instrument may be made by the operator so that the instrument is in proper operating order prior to mounting same within the housing of a test set.

Figure 6 illustrates a cover member 51, that may be of more or less circular or square shape, and which is adapted for insertion over the instrument parts disposed under the scale plate when the latter is secured to the mounting ring. The cover member serves to protect the mechanism from dust and against possible mechanical damage during the construction of the test set. It also carries a zero-adjuster arrangement of conventional construction including a slotted screw 55, insulator bushing 56, spring washer 57 and the insulator disc 58 having a pin 59 extending therefrom. Rotation of the slotted screw produces a rotation of the axially-offset pin. The pin 59 passes through the opening 45 in the abutment 43 (see Figure 4) when the cover 61 is inserted into position as shown in Figure 10. It will be apparent rotation of the screw 55 produces an angular rotation of the abutment 43 that is attached to an end of the lower hair spring 31 resulting in a displacement of the instrument pointer with respect to the calibrated scale plate. The cover 51 abuts against the lower surface of the scale plate and is held in position by the nuts 60 threaded on the posts 37 carried by the yoke 25, the base of the cover being provided with suitable holes for this purpose. Those skilled in this art will understand that the posts 37 can be insulated from each other and the cover 51 by suitable bushings and washers and electrical connection to the movable coil can be made by soldering a wire to suitable terminals 61 secured to such posts. Alternatively, the posts need not be insulated, in which case one side of the movable coil is grounded to the terminals 61. In such arrangement the other side of the movable coil is connected to a hair spring that is, in turn, connected to an abutment that is insulated from the rest of the structure. An insulated wire, passing through a suitable hole in the base of the cover 51 can be connected to such insulated abutment to complete the circuit to the movable coil.

Reference is now made to Figure 9 which is a front view of a representative test set comprising a housing 65 that carries the switches 66 and the binding posts 67. The front panel of the housing includes a transparent window 68, made of glass or plastic, exposing to view the scales 11 and a portion of the pointer 28. The four slots 14–17 in the scale plate 10 (see Figure 1) accommodate grommets 70 made of resilient or viscous material such as rubber (see also Figures 7 and 8). As shown in Figure 10, the scale plate is secured to the top panel 71 of the housing by suitable bolts 72 passing through the grommets into threaded inserts 73 that are molded into the top panel. The entire instrument, therefore, is supported from the panel by its own scale plate. Extensive tests have proven such construction is capable of withstanding severe mechanical shocks applied to the test set housing without damage to the instrument as a whole or to its component parts. Mechanical shocks are absorbed by the rubber grommets and by a flexing of the relatively thin instrument scale plate between the points of its suspension from the panel and its attachment to the instrument mechanism. The relatively heavy instrument mechanism is, so to speak, cradled between the shock-absorbing grommets.

The above described embodiment of the invention employs a separate mounting ring to which the scale plate and the instrument mechanism are attached. Figures 11 and 12 illustrate another embodiment of the invention wherein the scale plate is secured directly to the soft-iron yoke of the mechanism thereby eliminating the mounting ring. In this case the scale plate 80 is provided with an elongated opening 81 and the four holes 82. It will be noted the opening 81 and the holes 82 correspond in size and relative location to the similar opening 19 and holes 20 in the mounting ring 18 shown in Figure 2. Thus, the scale plate 80, Figure 11, can be substituted for such mounting ring and can be secured directly to yoke 25 of the instrument mechanism by the screws 83, as shown in Figure 12. The instrument assembly now comprises the instrument mechanism and the scale plate and such assembly is secured to the panel of a test set housing by means of screws passing through resilient grommets located in the notches 84 of the scale plate, as has been described with reference to Figures 9 and 10. The components of the instrument mechanism, such as the bridges, abutments, springs, pointer, etc., have been omitted from Figure 12 for purposes of clarity. It may here be pointed out that the rectangular scale plate shown in Figure 11 provides an increased lateral distance between the points of attachment of the instrument mechanism to the scale plate and the points at which the lower portion of the scale plate is suspended from the panel. This increases the distance over which the scale plate will flex when the test set housing is subjected to severe mechanical shock thereby further protecting the instrument mechanism from damage under such condition.

While I have now described two embodiments of the invention in which the instrument mechanism is of the core magnet type, the broad feature of the invention, namely the mounting of an instrument by its own scale plate for shock-protection purposes, is not limited to such specific application.

Reference is now made to Figures 13 and 14 wherein there is shown an instrument mechanism employing a C-shaped permanent magnet 90 provided with soft-iron pole pieces 91 spaced from a soft-iron core 92. The magnet structure is of more or less conventional design, the core 92 being supported by a bracket 93 that is secured to the pole pieces by the screws 94. In the illustrated construction the pole pieces present flat, rather than arcuate, surfaces to the core in order to obtain a desired deflection characteristic. The movable coil 95, carrying the pointer 96 is of the internal pivot type as disclosed in United States Patent No. 2,463,770 issued March 8, 1949 to Paul Huber and Alexander T. Williams. The scale plate 97, provided with the notches 98 that accommodate the resilient grommets 99, includes an opening 100 which is large enough to clear the magnet and pole pieces of the instrument mechanism. Thus, the instrument mechanism can be inserted into such opening and the scale plate secured to the mounting bracket by means of the screws 101 and nuts 102. A protective cover 103, provided with a zero-adjuster 104, may be inserted over the instrument mechanism for purposes explained with reference to Figure 10.

From the above description it will be clear my design provides a long scale meter with very simple and effective shock protection, with a minimum space requirement within the test set housing.

Having now described my invention in detail in accordance with the patent statutes, various changes and modifications will suggest themselves to those skilled in this art, and it is intended that such changes and modifications shall fall within the spirit and scope of the invention as recited in the following claim.

I claim:

In an electrical instrument the combination of a cylindrical, soft-iron yoke having an axial bore extending therethrough; a substantially cylindrical magnet disposed within the bore of the yoke and spaced from the yoke to form a flux gap; a pivotally-mounted movable coil rotatable in the flux gap and carrying a pointer; a metal scale plate having a substantially rectangular portion terminating in a triangular portion, said scale plate having a circular opening at the apex of the triangular portion which opening is of a size to permit passage of the said yoke therethrough, a pair of aligned slots formed in the opposite side edges of the rectangular portion, and a pair of slots formed in opposite edges of the triangular portion and along a line substantially bisecting the circular opening; a flat mounting plate secured to an end of the yoke, said plate extending beyond the scale plate hole and abutting the front surface of the scale plate; means including screws securing the said mounting plate to the scale plate; an arcuate scale on the front surface of the scale plate and cooperating with the pointer; a housing including a front panel, said housing enclosing the instrument and said front panel being of a size substantially larger than the said scale plate; a transparent member closing an opening in the said panel; a resilient grommet disposed in each of the scale plate slots; and mounting screws passing through the grommet and into threaded holes provided in the said panel to thereby suspend the scale plate from the panel with the scale exposed to view through the transparent member.

References Cited in the file of this patent

UNITED STATES PATENTS

| | | |
|---|---|---|
| 1,580,768 | Todd | Apr. 13, 1926 |
| 1,638,276 | Schultz | Aug. 9, 1927 |
| 1,927,346 | Lawrence | Sept. 19, 1933 |
| 2,284,048 | Ford | May 26, 1942 |
| 2,367,449 | Triplett | Jan. 16, 1945 |
| 2,425,595 | Butler | Aug. 12, 1947 |
| 2,515,021 | Simpson | July 11, 1950 |
| 2,528,640 | Coleman | Nov. 7, 1950 |